United States Patent [19]

Keitoku

[11] Patent Number: 5,036,188
[45] Date of Patent: Jul. 30, 1991

[54] REMOTE-CONTROL-LIGHT DETECTING DEVICE FOR AV APPARATUS

[75] Inventor: Noboru Keitoku, Tokyo, Japan

[73] Assignee: Pioneer Electronic Corporation, Tokyo, Japan

[21] Appl. No.: 494,284

[22] Filed: Mar. 16, 1990

[30] Foreign Application Priority Data

Jul. 24, 1989 [JP] Japan ................. 1-86733[U]

[51] Int. Cl.$^5$ .......................... H01J 3/14; H01J 5/02
[52] U.S. Cl. ................................. 250/216; 250/239
[58] Field of Search ........ 250/577, 216, 239, 214 AL; 362/153, 276, 802

[56] References Cited

U.S. PATENT DOCUMENTS 4,907,139  3/1960  Quiogue .

Primary Examiner—David C. Nelms
Assistant Examiner—LaCharles P. Keesee
Attorney, Agent, or Firm—Sughrue, Mion, Zinn Macpeak & Seas

[57] ABSTRACT

A remote-control-light detecting device includes a light-receiving lens which is fitted in a front panel of an AV apparatus and has a wide-angle lens surface. Examples of the wide-angle lens surface are a spherical surface and a pyramidal surface.

9 Claims, 3 Drawing Sheets

REMOTE-CONTROL-LIGHT DETECTING DEVICE FOR AV APPARATUS

BACKGROUND OF THE INVENTION

The present invention relates to a remote-control-light detecting device for an AV (audio-visual) apparatus, and particularly relates to a photo-detecting device having an improved remote-control-light receiving portion provided in a front panel of an AV apparatus.

Recently, remote control devices have become popular by which a viewer or listener can perform, from a position away from an apparatus such as a TV receiver, a stereo apparatus, etc., operations such as power on/off operation, sound volume increasing/decreasing operation, channel change-over operation, and so on, bringing much convenience in carrying out those operations of the AV apparatus.

In many of such remote control devices, an operation signal is transmitted to an apparatus to be controlled in the form of modulated infrared light. A portion for receiving the infrared light is provided in a front panel of the apparatus. As shown in FIGS. 8 and 9, a plane transparent portion 2 is provided in a front panel 1, and light such as infrared light transmitted through the transparent portion 2 is made incident directly (FIG. 8) or through a glass fiber 4 (FIG. 9) upon a photo-detecting element 3 which is part of an operation command system provided on a printed circuit board.

Photo-detecting devices of such remote control devices have the following problems Since the photo-detecting device has a plane light-receiving surface, in order to make remote control light incident accurately upon the light-receiving surface from any position in a wide angular range, it is necessary to make the area of the light-receiving surface large. To this end, a relatively wide area of the light-receiving surface must be secured in spite of the limited area of the front panel of an AV apparatus. It is therefore unavoidable to sacrifice areas for the rest of the operation system and a display system. Specifically in a small AV apparatus such as a mobile apparatus, the front panel is very narrow in area, so that the size of the light-receiving surface remarkably sacrifices areas for the other system such as a display system.

Further, in remote control operation, it is necessary to make remote control light incident upon the light-receiving surface substantially perpendicularly. There has been therefore a case where no response is obtained to an operation performed from a direction slanting relative to the front panel.

SUMMARY OF THE INVENTION

It is an object of the present invention to provide a photo-detecting device for an AV apparatus which has a narrow area of a surface for receiving infrared light or the like and which can surely catch signal light incident upon a light-receiving surface from any position within a wide angular range even with such a narrow light-receiving surface.

In order to attain the above object, according to the present invention, a remote-control-light detecting device comprises a light-receiving portion, provided on a front panel of an AV apparatus, for detecting operating light such as remote control infrared light. The light-receiving portion includes a wide-angle lens surface having a wide light-receiving angle.

In the photo-detecting device according to the present invention, since the lens used in the light-receiving portion has a convex surface or a pyramidal surface, remote control operation can be surely performed even if the optical axis of the incident light discords with the central axis of the light-receiving portion.

DETAILED DESCRIPTION OF THE PREFERRED EMBODIMENTS

Figure 1:
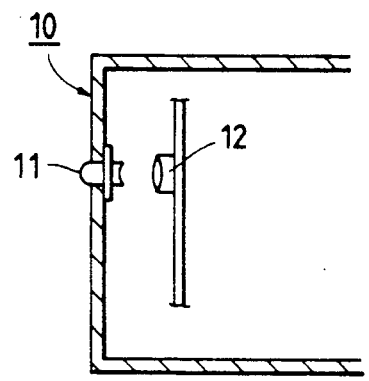
FIG. 1 is a schematic view for explaining an embodiment of a photo-detecting device according to the present invention.

Referring to FIGS. 1 through 7, various embodiments of the photo-detecting devices according to the present invention will be described hereunder. In the drawings, reference numeral 10 represents a front panel of an AV apparatus. A light-receiving lens 11 is fitted in the front panel 10 in a suitable place so that the lens 11 can act as a light-receiving portion for receiving incident light, such as infrared light, acting as a remote control signal. The incident light transmitted through the light-receiving lens 11 is converged upon a photo-detecting element 12 provided inside the apparatus. The light-receiving lens 11 is projected from the surface of the front panel 10 and has a curved surface such as a spherical surface, so that a light-receiving range substantially larger than previous system is established three-dimensionally.

Figure 2:
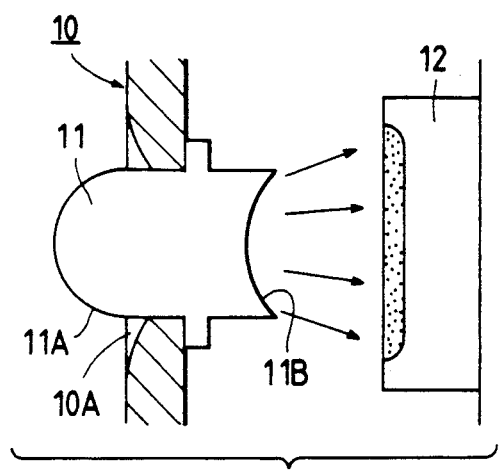
FIG. 2 is an enlarged sectional view of the same embodiment.

In an embodiment illustrated in FIG. 2, the light-receiving portion, that is, the light-receiving lens 11 has a generally cylindrical shape. More specifically, the lens 11 is composed of a light-receiving end portion 11A which has a spherical surface, the other end surface 11B which is concave, and an intermediate portion 11C which acts as a light-conducting portion. In this case, in order to extend the light-receiving angle of the light-receiving lens 11, it is preferable to form a carved portion 10A in the front panel 10 around the lens 11.

Figure 3:
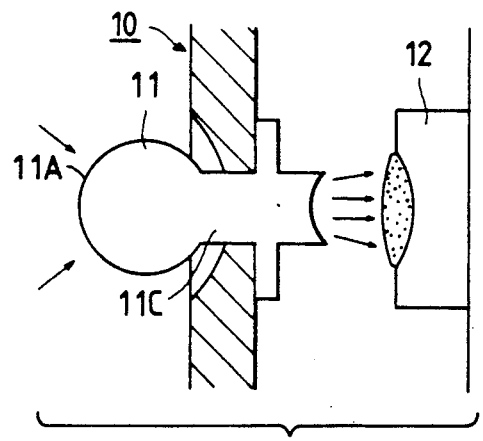
FIG. 3 is an enlarged sectional view of another embodiment.

FIG. 3 shows another embodiment of a photo-detecting device in which a light-receiving lens 11 is composed of a light-receiving end portion 11A which is a spherical body, and a light-conducting portion 11C which has a diameter smaller than that of the spherical light-receiving end portion 11A so that light incident upon the light-receiving end portion 11A is led to a photo-detecting element 12 through the light-conducting portion 11C.

Figure 4:
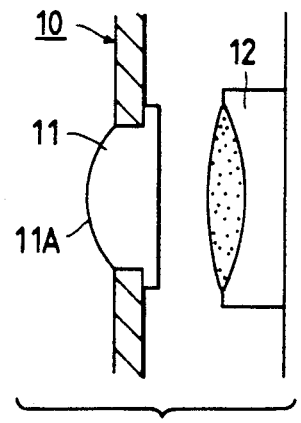
FIG. 4 is an enlarged sectional view of a further embodiment.

In a further embodiment of a photo-detecting device illustrated in FIG. 4, a light-receiving lens 11 has a light-receiving end portion 11A which has a spherical surface of a large curvature radius.

Figure 5A:
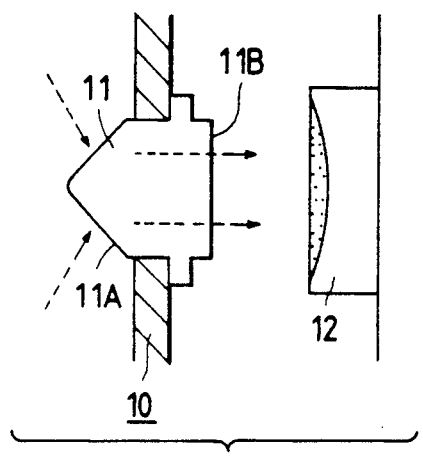
FIGS. 5(A) and 5(B) are enlarged sectional view and a front view of a further embodiment, respectively.
Figure 5B:
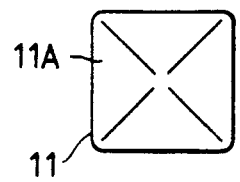

In a still further embodiment of a photo-detecting device illustrated in FIGS. 5(A) and 5(B), a light-receiving lens 11 has a light-receiving end portion 11A which is a quadrangular pyramid, so that the photo-detecting element 12 can receive light from a wider range. The shape of the pyramid of the light-receiving end portion 11A is not limited to a quadrangular pyramid.

Figure 6:
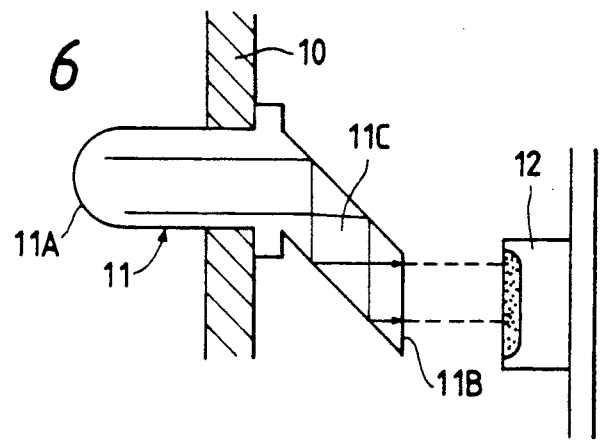
FIGS. 6 and 7 are enlarged sectional views of further embodiments, respectively.

In another embodiment illustrated in FIG. 6, a light-receiving lens 11 is composed of a light-receiving end portion 11A which has a spherical surface, and a light-conducting portion 11C. The central axis, that is, the optical axis, of the lens 11 is bent in the photo-conducting portion 11C so that the incident light reaches the photo-detecting element 12 after it is reflected repeatedly by total reflection in the light-conducting portion 11C. With this structure, a position of the light-receiving lens 11 can be displaced relative to the photo-detecting element 12.

Figure 7:
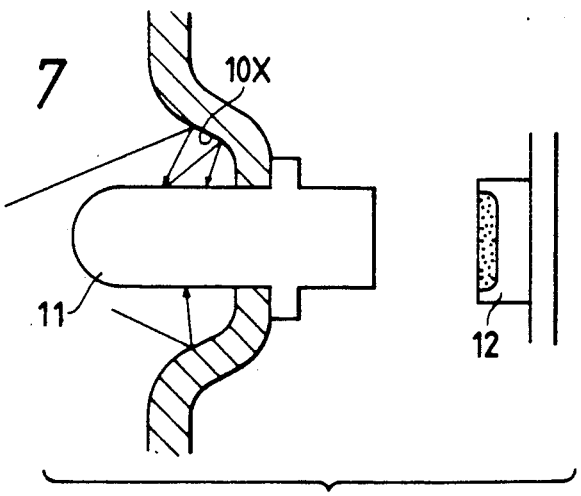
Figure 8:
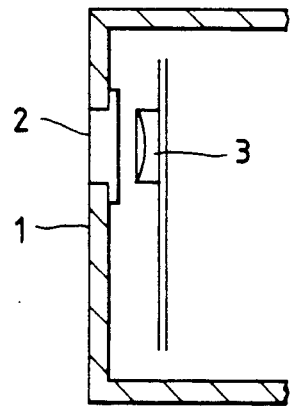
FIG. 8 is a sectional view of a conventional photo-detecting device.
Figure 9:
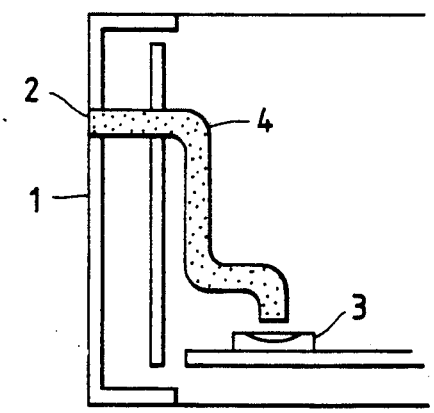
FIG. 9 is a sectional view of another conventional device.

In a further embodiment illustrated in FIG. 7, a parabolic light-converging portion 10X is formed in the front panel 10 so as to surround the light-receiving lens 11 fitted in the front panel 10. Thus, it is possible to improve the convergence of light toward the light-receiving lens 11.

According to the invention, not only it is a matter of course that there is no problem in the case where the remote-control light emitted for the purpose of operation of the AV apparatus completely agrees with the optical axis of the light-receiving lens 11, but even in the case where the incident light and the optical axis of the light-receiving lens 11 cross each other at an angle close to 90 degrees, the incident light can be surely led to the photo-detecting element 12 as a remote control signal. In other words, even in the case where a viewer or listner operates the apparatus from a position shifted from the position just in front of the apparatus, it is possible to effect a desired operation.

As apparent from the above description, the photo-detecting device according to the present invention has the light-receiving end portion of the light-receiving lens provided on the front panel, which is made spherical or pyramidal. This provides such advantages that the light-receiving range is made wide, even a small lens can work properly, the operating position is not limited, and the area occupied by the light-receiving lens on the front panel can be minimized.

What is claimed is:

1. A remote-control-light detecting device for an audio-visual apparatus, comprising:
    a front panel of the audio-visual apparatus;
    a light-receiving lens fitted in the front panel, for receiving remote control light, the light receiving lens having a wide-angle lens surface at its input side; and
    a photo-detecting element for detecting light output from the light-receiving lens, wherein said photo-detecting element receives incident light rays representing a remote control signal.

2. The device according to claim 1, wherein the wide-angle lens surface is a spherical surface.

3. The device according to claim 1, wherein the wide-angle lens surface is a pyramidal surface.

4. The device according to claim 1, wherein an optical axis of the light-receiving lens is bent at its intermediate point.

5. The device according to claim 1, wherein a portion of a light-receiving side of the front panel that surrounds the light-receiving lens is carved so that a light-receiving angle of the light-receiving lens is increased.

6. The device according to claim 1, wherein a portion of a light-receiving side of the front panel that surrounds the light-receiving lens is curved so as to form a concave portion so that part of the remote-control light is reflected by the concave portion and then received by the light-receiving lens.

7. The device according to claim 1, wherein said light-receiving lens includes a concave light emitting end portion and said front panel includes a carved portion around said light receiving lens, in order to extend the light receiving range thereof.

8. The device according to claim 1, wherein said light-receiving lens has a spherical light-receiving end portion, which has a larger diameter than a light conducting portion of said light receiving lens.

9. The device according to claim 6, wherein said concave portion of said front panel is a parabolic light-converging portion.

* * * * *